US006969979B2

(12) United States Patent
Kohout et al.

(10) Patent No.: US 6,969,979 B2
(45) Date of Patent: Nov. 29, 2005

(54) MULTIPLE MODE SWITCHING REGULATOR HAVING AN AUTOMATIC SENSOR CIRCUIT FOR POWER REDUCTION

(75) Inventors: James A. Kohout, Dallas, TX (US); David J. Baldwin, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/797,780

(22) Filed: Mar. 9, 2004

(65) Prior Publication Data

US 2005/0200341 A1 Sep. 15, 2005

(51) Int. Cl.$^7$ ................................. G05F 1/56
(52) U.S. Cl. ...................................... 323/282
(58) Field of Search ................ 323/265, 269, 323/282, 284, 351

(56) References Cited

U.S. PATENT DOCUMENTS

| | | | |
|---|---|---|---|
| 6,215,288 B1 | 4/2001 | Ramsey et al. | 323/224 |
| 6,313,616 B1 * | 11/2001 | Deller et al. | 323/282 |
| 6,366,066 B1 * | 4/2002 | Wilcox | 323/282 |
| 6,367,023 B2 | 4/2002 | Kling et al. | 713/340 |
| 6,385,060 B1 | 5/2002 | Basso et al. | 363/21.15 |
| 6,480,043 B2 | 11/2002 | Hall et al. | 327/108 |
| 6,498,467 B1 | 12/2002 | Stratakos | 323/284 |
| 6,608,521 B1 | 8/2003 | Baldwin et al. | 330/10 |
| 6,650,093 B1 | 11/2003 | Baldwin et al. | 323/224 |
| 6,650,100 B1 | 11/2003 | Kohout et al. | 332/282 |
| 2002/0135338 A1 | 9/2002 | Hobrecht et al. | |
| 2003/0205991 A1 * | 11/2003 | McDonald et al. | 323/271 |
| 2004/0004470 A1 * | 1/2004 | Yoshida et al. | 323/284 |
| 2005/0017703 A1 * | 1/2005 | Walters et al. | 323/288 |

* cited by examiner

Primary Examiner—Adolf Berhane
(74) Attorney, Agent, or Firm—April M. Mosby; W. James Brady, III; Frederick J. Telecky, Jr.

(57) ABSTRACT

A switching regulator having a control circuit that automatically senses when a low power mode should be initiated without the use of expensive external components nor an extensive amount of external components is disclosed herein. The switching regulator includes an input switching device, a driver, an inductor, a first output switching device, a second output switching device and an output node. The control circuit includes a low power switching device connected to the output node and the second end of the inductor. An amplifier connects the low power switching device and the first output switching device. A first current mirror couples to the amplifier to mirror the difference between the output current through the output load and the current supplied at the second end of the inductor. A second current mirror couples to the first current mirror to mirror the current difference through a current source and a capacitor connected in parallel across the current source. A comparator compares the voltage generated by the capacitor with a predetermined voltage source. A first and second AND gate couples to the comparator. The output of the first AND gate provides a entry signal that initiates the low power mode for the switching regulator. The second AND gate couples to receive this entry signal. The output of the first AND gate provides a exit signal that indicates when the switching regulator is not in low power mode. The first AND gate couples to receive this exit signal.

15 Claims, 5 Drawing Sheets

MULTIPLE MODE SWITCHING REGULATOR HAVING AN AUTOMATIC SENSOR CIRCUIT FOR POWER REDUCTION

This application claims priority under 35 USC § 119(e)(1) of provisional application Ser. No. (TBN), filed Feb. 26, 2004.

FIELD OF THE INVENTION

The present invention relates to switching regulators, and, more particularly, to a multiple-mode switching regulator having an automatic sensor circuit that places the switching regulator in a low power mode.

BACKGROUND OF THE INVENTION

Switching regulators are used to provide a constant supply of voltage to the circuitry within prescribed voltage tolerances. They are often used in portable electronic devices that have lower power requirements where the input voltage is supplied by a power source, such as a battery, that may fluctuate overtime due to contact corrosion, dissipation, temperature or other external environment conditions or changes thereof. The switching regulator receives the input voltage from the power source and converts it to a voltage within the prescribed voltage tolerance. Thereby, the switching regulator provides a regulated output voltage to a load from an unregulated input voltage. Specifically, the switching regulator provides and maintains a predetermined output voltage to a portable electronic device circuitry coupled thereto. As such, circuitry incorporated within the switching regulator regulates the voltage to within prescribed voltage tolerances of the device circuitry even in the presence of wide deviations in the power source voltage.

The switching regulator may be used to convert a power source signal to a higher or lower controlled voltage output. A control circuit for generating pulse width modulation within the switching regulator functions as an oscillator which provides a periodic carrier signal. By rapidly opening and closing a switch within the switching regulator, the control circuit controls the average power that is provided to a load coupled to the switching regulator by controlling the average voltage applied to the load.

A typical switching regulator has at least two switches that switch ON and OFF out of phase with each other to supply current to a load. Three types of switching regulators include: buck mode switching regulators, which regulate an output voltage that is lower than the input voltage; boost mode regulators, which regulate an output voltage that is higher than the input voltage; and buck-boost mode switching regulators, which regulate an output voltage that is higher, lower, or the same as the input voltage. These three modes can be combined to form a multiple mode switching regulator.

A typical multiple mode switching regulator includes an inductor with a first end coupled to both a first high side switch, a first low side switch, and a second end coupled to both a second high side switch and a second low side switch. The first high side switch and first low side switch are on the input side. The second high side switch and second low side switch are on the output side. In buck mode, the first high side switch and first low side switch are switched ON and OFF out of phase with each other. In boost mode, the second high side switch and second low side switch are switched ON and OFF out of phase with each other. In buck-boost mode, the first high side switch and the second low side switch are switched ON and OFF in phase with each other, and the second high side switch and the first low side switch are switched ON and OFF in phase with each other, but out of phase with the first high side switch and second low side switch.

Advantageously, switching regulators are often used in electronic devices because of their greatly increased efficiency at higher loads. This increase in efficiency presents a substantial advantage for battery powered devices. The efficiency, however, is reduced greatly when a minimal current load is present. As a solution, a switching regulator may include a low power mode to increase the efficiency when the load current has fallen below a certain predetermined threshold. During the low power mode, various blocks within the regulator are turned off and a simpler control loop may be employed. Unfortunately, the simpler control loop decreases regulation tolerance.

Most switching regulators do not implement a low power mode that maintains a regulated output voltage. Many switching regulators that include a low power mode do not automatically sense the output current in an effort to make a determination of whether the low power mode should be entered or exited from. Furthermore, many of these switching regulators require a low power mode input signal to initiate the low power mode. There, however, are a few switching regulators that sense the output current and provide a feature of automatic entrance and exit from a low power mode. Unfortunately, these switching regulators require an expensive precision resistor or a current transformer to sense current and are dependent on the capacitor value and input and output voltage.

Thus, a need exists for a switching regulator having a low power mode that automatically senses when this mode should be initiated without the use of expensive external components nor an extensive amount of external components.

SUMMARY OF THE INVENTION

To address the above-discussed deficiencies of switching regulators, the present invention teaches a switching regulator having a low power control circuit that automatically senses when the low power mode should be initiated without the use of expensive external components nor an extensive amount of external components. The switching regulator in accordance with the present invention includes a driver coupled to receive a first high side control signal. An input switching device includes a control node that connects to the driver and a drain node that receives an input voltage. A diode couples between the source node of the input switching device and ground. A first end of an inductor connects to the node formed between the source node of the input switching device and the diode. A first output switching device includes a drain node connected to the second end of the inductor and a control node connected to a second high side control signal node. A second output switching device includes a drain node connected to the second end of the inductor and a control node connected to a low side control signal node. An output load and an output capacitor connect between the source nodes of the first and second output switching devices. A low power control circuit couples across the inductor to monitors the current across the output load and automatically initiates the low power mode of the switching regulator independent of the value of the output voltage, the output capacitor, the inductor and the input voltage.

The low power control circuit includes a low power switching device that includes a control node connected to the high side control signal node and a drain node connected to the second end of the inductor. An amplifier connects to the source node of the low power switching device and the first output switching device. A first current mirror couples to the amplifier to mirror the output current delivered to the output load through the first output switching device. A second current mirror couples to the first current mirror to pass the mirrored output load current to a summing node, which is coupled to a current source and a capacitor. A comparator compares the voltage generated across the capacitor with a predetermined voltage source. A first and second AND gate couples to the comparator. A first and second counter couple to the first and second AND gates respectively. The output of the first counter supplies a low power mode entry signal that initiates the low power mode for the switching regulator. The second AND gate couples to receive this low power mode entry signal. The output of the second counter supplies a low power mode exit signal that indicates when the switching regulator should exit low power mode. The first AND gate couples to receive this low power mode exit signal.

Advantages of this design include but are not limited to a switching regulator that automatically enters into a low power mode without the requirement of an external signal. The switching regulator in accordance with the present invention does not require an expensive precision resistor coupled to the output to sense output current; nor does it require an additional feedback pin from the resistor. This embodiment does implement the use of an additional capacitor; yet, this capacitor can be a standard ceramic type with no special requirements. In addition, the capacitor's value can vary widely without altering the performance of the switching regulator. This embodiment is also independent of input voltage, duty cycle, inductor value, output voltage, and most importantly output capacitance.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set for the herein. Rather, these embodiments are provided so that this disclosure will be thorough and complete, and will fully convey the scope of the invention to those skilled in the art.

The present invention is best understood by comparison with the prior art. Hence, this detailed description begins with a discussion of known switching regulator shown in FIG. 1 and the switching regulator disclosed in U.S. Pat. No. 6,650,100B1 entitled "Bootstrap Technique For A Multiple Mode Switching Regulator" which is incorporated herein.

Figure 1:
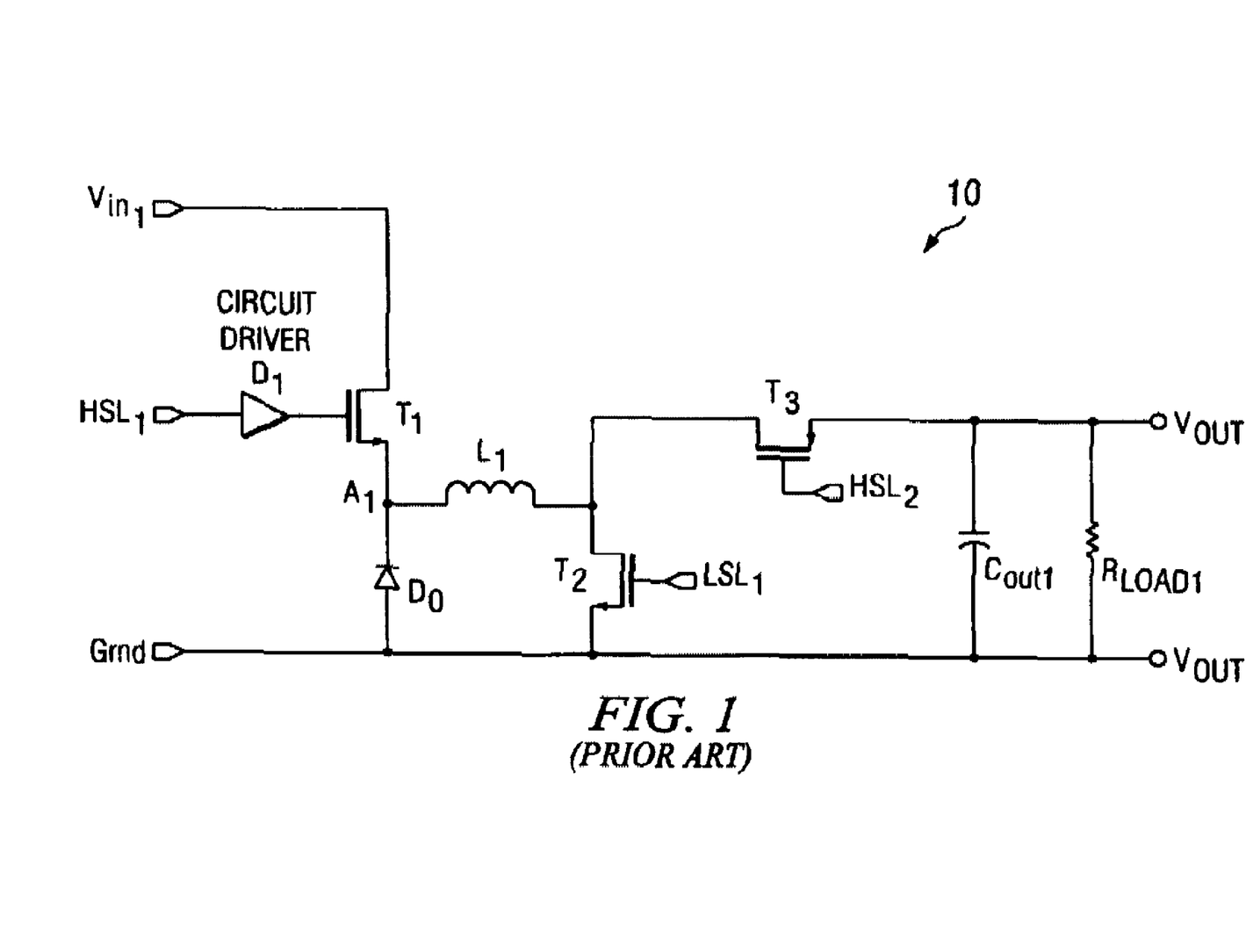
FIG. 1 illustrates a known switching regulator.

FIG. 1 illustrates a known switching regulator 10 that includes a circuit driver $D_1$, an input switching device $T_1$, a diode $D_0$, an inductor $L_1$, a first output switching device $T_3$, a second output switching device $T_2$, an output capacitor $C_{out}$, and an output resistive load $R_{load1}$.

As stated previously, a typical multiple mode switching regulator includes an inductor with a first end coupled to both a first high side switch, a first low side switch, and a second end coupled to both a second high side switch and a second low side switch. The first high side switch and first low side switch are on the input side. The second high side switch and second low side switch are on the output side. In buck mode, the first high side switch and first low side switch are switched ON and OFF out of phase with each other. In boost mode, the second high side switch and second low side switch are switched ON and OFF out of phase with each other. In buck-boost mode, the first high side switch and the second low side switch are switched ON and OFF in phase with each other, and the second high side switch and the first low side switch are switched ON and OFF in phase with each other, but out of phase with the first high side switch and second low side switch.

This circuit shown in FIG. 1, however, differs in design from the conventional switching regulator disclosed previously in that there is only one high "side input switch $T_1$, whereas diode $D_0$ performs the function of the first low side input switch. In the alternative, $D_0$ could be substituted with a two other types of transistors, either MOS FET or BJT."

As shown, an input voltage $V_{in1}$ is supplied to the drain node of input switching device $T_1$. The circuit driver $D_1$ connects to receive a high side input $HSL_1$. The output of circuit driver $D_1$ connects to the control node of input switching device $T_1$. The inductor $L_1$ couples between the source of the input switching device $T_1$ and the drain of the second output switching device $T_2$, while the source of second output switching device $T_2$ couples to ground. The drain of the first output switching device $T_3$ couples to inductor $L_1$. A high side control signal $HSL_2$ coupled to the control node of the first output switching device $T_3$, while a low side control signal $LSL_1$ couples to the control node of the second output switching device $T_2$. Capacitor $C_{out1}$ and resistor $R_{load1}$ couple in parallel across the source node of first output switching device $T_3$ and ground.

In operation, during buck mode, the input switching device $T_1$ is switched ON and OFF, while second output switching device $T_2$ is off completely and first output switching device $T_3$ is always on. When the input switching device $T_1$ turns off, node $A_1$ decreases to a voltage corresponding to diode $D_0$ below ground (−0.7V). The current decays in inductor $L_1$ because the voltage at node $A_1$ is lower than the output voltage, $V_{out}$. In the alternative, when the input switching device $T_1$ turns on, node $A_1$ increases in voltage. The current builds in inductor $L_1$ because the voltage at node $A_1$ is higher than the output voltage, $V_{out}$.

In boost mode, the first output switching device $T_3$ and the second output switching device $T_2$ are switched ON and OFF out of phase with each other.

In buck-boost mode, the input switching device $T_1$ and the second output switching device $T_2$ are switched ON and OFF in phase with each other, and the first output switching device $T_3$ is switched ON and OFF out of phase with the input switching device $T_1$ and second output switching device $T_2$.

Figure 2:
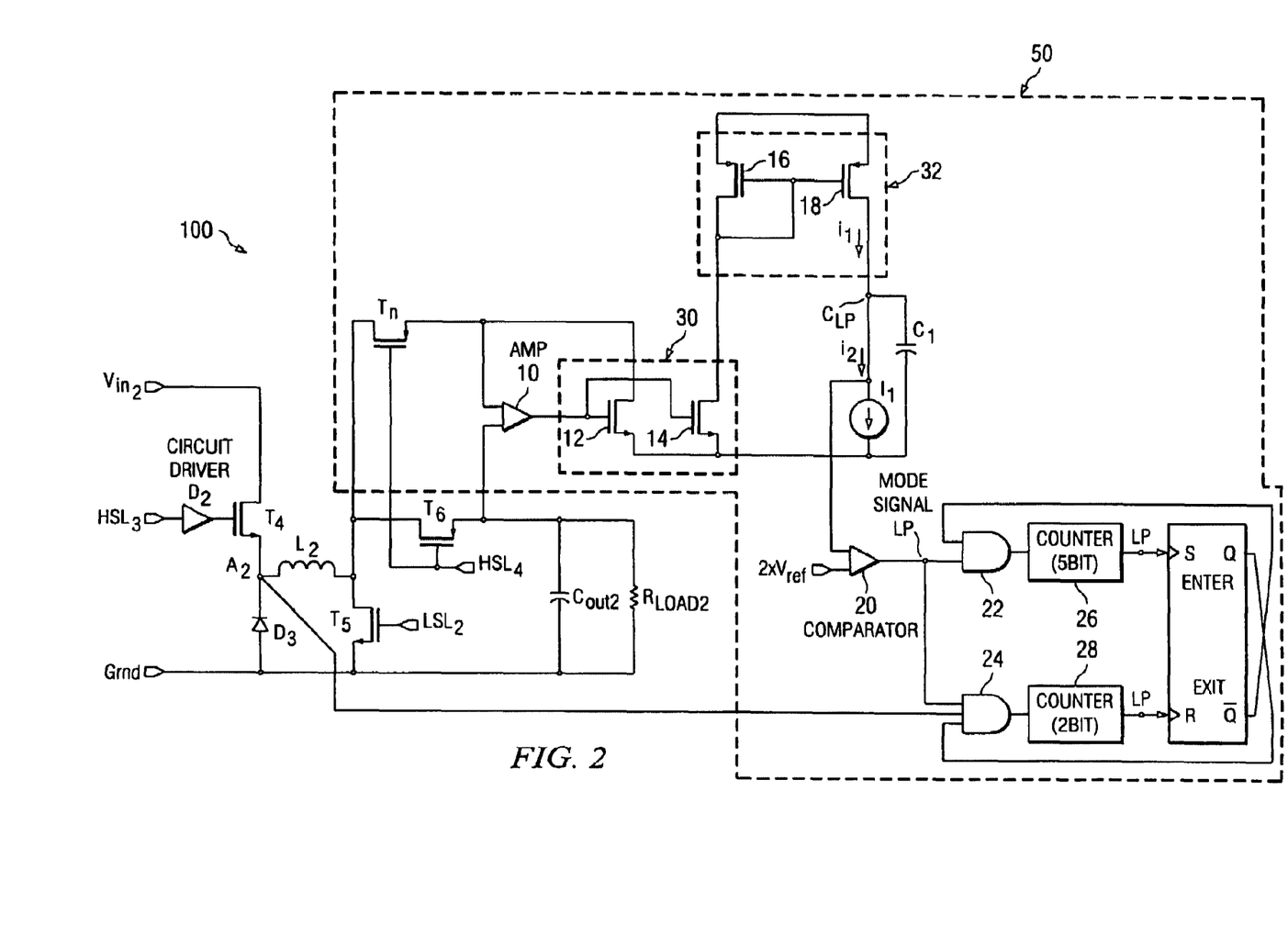
FIG. 2 illustrates a switching regulator in accordance with the present invention.

As shown in FIG. 2, a switching regulator 100 in accordance with the present invention includes a circuit driver $D_2$, an input switching device $T_4$, a diode $D_3$, an inductor $L_2$, a first output switching device $T_6$, a second output switching device $T_5$, an output capacitor $C_{out2}$, an output resistive load $R_{load2}$, and low power control circuit 50. Low power control circuit includes a switching device $T_7$, an amplifier 10, a first current mirror 30, a second current mirror 32, a current source $I_1$, a capacitor $C_1$, a comparator 20, a first AND gate 22, a second AND gate 24, a first counter 26, a second counter 28, and a set/reset latch 34.

Switching regulator 100 uses an external capacitor $C_{out2}$ and the internal sense FETs, $T_6$ and $T_7$, to determine the load current under any condition. Once the load current is sensed, the control circuit 50 within switching regulator 100 generates to signal that initiates entry into the low power mode $LP_{enter}$ or exit therefrom $LP_{exit}$. In addition, the switching device $T_7$ in the present invention is a sense FET. Conventional switching regulators do not use a sense FET as a second high side switching device as switching device $T_7$ has been implemented in this design. Most conventional switching regulators are designed to implement the use of an external sense resistor or a current sense transformer.

As shown, an input voltage $V_{in2}$ is supplied to the drain node of input switching device $T_4$. The circuit driver $D_2$ connects to receive a high side input $HSL_3$. The output of circuit driver $D_2$ connects to the control node of input switching device $T_4$. The inductor $L_2$ couples between the source of the input switching device $T_4$ and the drain of the second output switching device $T_5$, while the source of second output switching device $T_5$ couples to ground. The drain of the first output switching device $T_6$ couples to inductor $L_2$. A high side control signal $HSL_4$ coupled to the control node of the first output switching device $T_6$, while a low side control signal $LSL_2$ couples to the control node of the second output switching device $T_5$. Capacitor $C_{out2}$ and resistor $R_{load2}$ couple in parallel across the source node of first output switching device $T_6$ and ground.

Low power control circuit 50 includes sense switching device $T_7$ which connects to amplifier 10. Specifically, the drain node of sense switching device $T_7$ connects to the second end of inductor $L_2$, the control node couples to the high side control signal $HSL_4$, the source node couples to amplifier 10. Sense FET $T_7$ senses current in both the normal operating mode and the low power mode. Those skilled in the art may recognize that sense FET $T_7$ may be replaced with a similar switching device; yet, switching device $T_7$ must match switching device $T_6$ for the circuit to operate correctly. Once the load current is sensed the average output current can be derived, even without continuous current through the FET $T_6$.

Current mirror 30 couples between amplifier 10 and second current mirror 32. Current mirror 32 connects to current source $I_1$. Capacitor $C_1$ couples across current source $I_1$. Sensing FET $T_7$ senses the current and mirrors the current with that supplied to the load through FET $T_6$. This current is mirrored by current mirrors, 30 and 32, into capacitor $C_1$. This current is proportional to the output. It is subtracted from the reference current $I_1$. The difference is integrated by capacitor $C_1$. A voltage dependent on the output load appears at comparator 20. This voltage enables the decision for entering and exiting the low power mode.

Comparator 20 couples to receive a voltage that is twice the value of the reference voltage $V_{ref}$ and the voltage at node $C_{LP}$. Effectively, comparator $C_1$ compares the voltage generated by the capacitor with this predetermined voltage. A first and second AND gate, 22 and 24, couples to comparator $C_1$. A first and second counter, 26 and 28, couple to the first and second AND gates, 22 and 24, respectively. The output of the first counter 26 supplies a low power mode entry signal $LP_{enter}$ that initiates the low power mode for the switching regulator 100. The set input of the set/reset latch 34 couples to receive this low power mode entry signal $LP_{enter}$. The second AND gate 24 couples to receive the output of the set/reset latch 34. The output of the second counter 28 supplies a low power mode exit signal $LP_{exit}$ that indicates when the switching regulator 100 should exit low power mode. The reset input of the set/reset latch 34 couples to receive this low power mode entry signal $LP_{exit}$. The first AND gate 22 couples to receive the inverted output of the set/reset latch 34.

Specifically, comparator 20 compares the voltage across capacitor $C_1$ with the value of two times the reference voltage $V_{ref}$. As shown, current $i_1$ is the current that enters node $C_{LP}$ and current $i_2$ is the current provided by current source $I_1$. When the average current $i_1$ becomes less than current $i_2$, comparator 20 will generate a signal $LP_{enter}$ that signifies that switching regulator 100 may enter low power mode, wherein signal $LP_{enter}$ will be "high". Counter 26 is a five bit counter that determines that switching regulator 100 will enter into low power mode after the signal is available over 32 cycles. Note that the value of counter 26 is not critical and may vary from one implementation to another. It is used to digitally filter the signal.

Switching regulator 100 functions as the following during the normal mode of operation. During buck mode, the input switching device $T_4$ is switched ON and OFF, while second output switching device $T_5$ is off completely and first output switching device $T_6$ is always on. When the input switching device $T_4$ turns off, node $A_2$ decreases to a voltage corresponding to diode $D_0$ below ground (−0.7V). The current decays in inductor $L_2$ because the voltage at node $A_2$ is lower than the output voltage, $V_{out}$. In the alternative, when the input switching device $T_4$ turns on, node $A_2$ increases in voltage. The current builds in inductor $L_2$ because the voltage at node $A_2$ is higher than the output voltage, $V_{out}$.

Switching device $T_4$ turns on for a short period of time. The load current is discontinuous. It is only constant during the one period of the switch $T_4$. When switching device $T_4$ on, it integrates current into the capacitor $C_1$ through current $i_1$.

When switching device $T_4$ is high, switching device $T_6$ is on. Thereby, current flows through the inductor $L_1$ which produces a triangle wave. At the same time, switching device $T_7$ is on and senses the load current. Amplifier 10 creates a ratio metric current from switching device $T_6$ in switching device $T_7$, using current mirror 30 implemented by transistors, 12 and 14. The current through current mirror 30 is further mirrored by current mirror 32 implemented by 16 and 18 to provide current $i_1$ which is proportional to the load current. The sense FET $T_7$ and amplifier 10 provide a current that is proportional to the current through switching device $T_6$.

Figure 4:
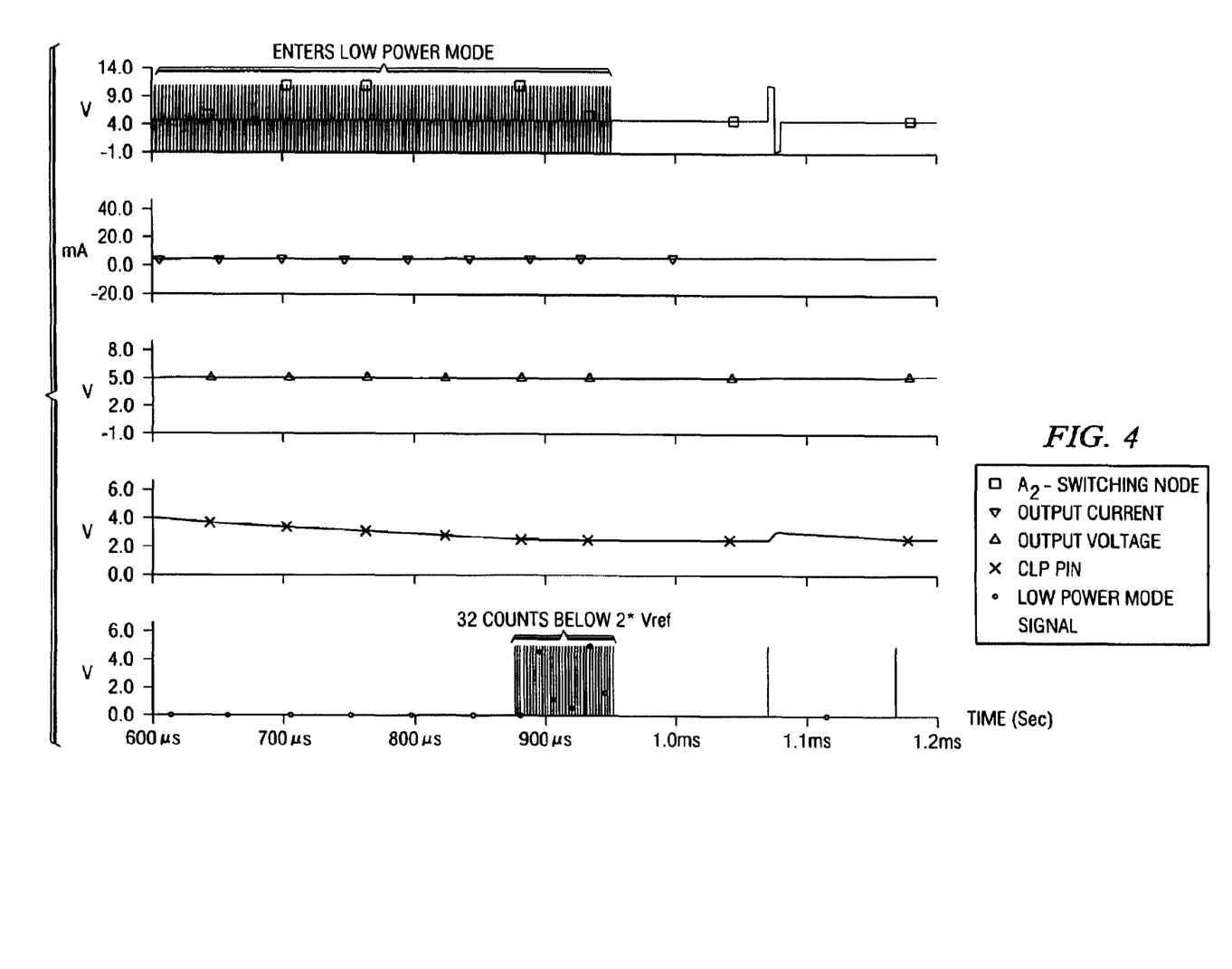
FIG. 4 shows the timing diagram of the switching node, the output current, the output voltage, the low power capacitance node, and the low power mode signal of the switching regulator shown in FIG. 2 for entrance into the low power mode.

During the determination of whether the switching regulator 100 should enter the low power mode, it is assumed that the voltage on the $C_{LP}$ pin is above twice the reference voltage $V_{ref}$, since it is pulled high during the startup of the device. If the average (sense FET mirrored) current $i_1$ is less than the current of the trimmed current source $I_1$, the voltage at node $C_{LP}$ will start to decrease. Once the voltage drops below twice the reference voltage $V_{ref}$, the comparator signals the LPModeSignal which goes into a 5-bit up counter. If 32 consecutive LPMode signals are received, then the part enters low power mode. This works for all modes, buck, boost, and buck-boost, since the average output current is always delivered through the $T_4$ FET. An example of entering low power mode is shown in FIG. 4.

Regarding exiting low power mode, most of the control loop circuitry and switching of the main power FETs are turned off until needed when the switching regulator is in low power mode. The switching frequency is then dependent upon the output load $R_{load2}$ and the output capacitance $C_{out2}$, with a hysteric operation determined by the comparators of the output voltage. When this is occurring, the current through switching device $T_6$ is discontinuous, with the output current supplied by the charge on the large output capacitor $C_{out2}$. In the same manner described previously for the normal mode of operation, to sense output current during this case, a ratio of the output charge placed on the output capacitor $C_{out2}$ is placed on capacitor $C_1$ and slowly bled off by a fixed internal current source $I_1$. If the charge placed on capacitor $C_1$ is less than the fixed internal sources time/current relationship, then the output current is less than the threshold, and switching regulator 100 stays in low power mode. If the charge increases above the internal current source threshold for two consecutive cycles, switching regulator 100 exits low power mode and runs at the standard fixed switching frequency.

Figure 5:
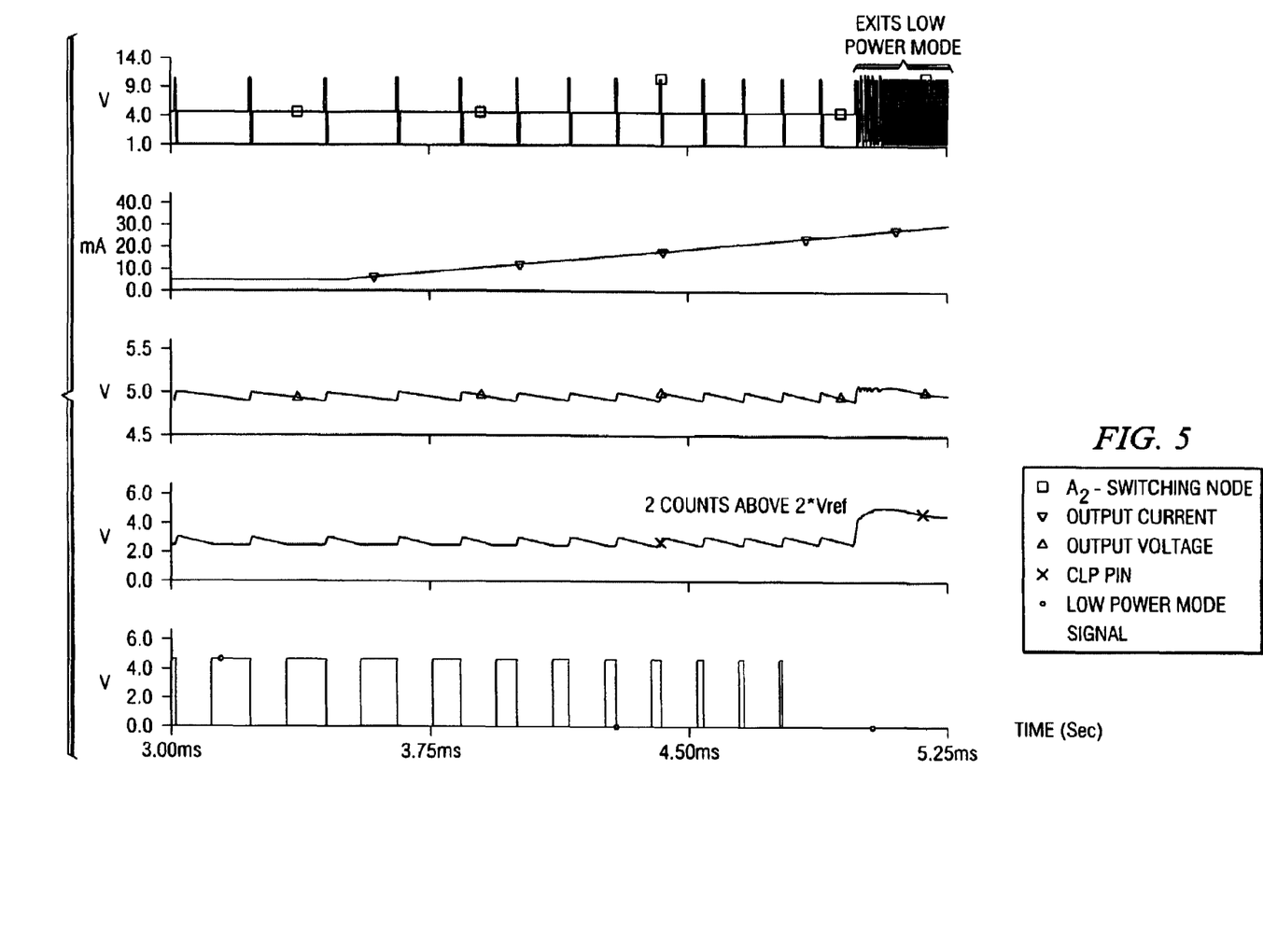
FIG. 5 displays the timing diagram of the switching node, the output current, the output voltage, the low power capacitance node, and the low power mode signal of the switching regulator shown in FIG. 2 for exiting out of the low power mode.

Specifically, when current $i_1$ becomes greater than current $i_2$, comparator 20 will generate a signal that signifies that the switching regulator may exit low power mode. Counter 28 is a two bit counter that determines if the charge increases above the internal current source threshold for at least two consecutive cycles. When the charge is above the internal current source threshold for at least two consecutive cycles, the switching regulator 100 exits low power mode and runs at the standard fixed switching frequency. An example of this operation is shown in FIG. 5.

In boost mode and buck-boost mode, the switching regulator will function similar to that of buck mode with the following exceptions. Specifically, in boost mode, the first output switching device $T_6$ and the second output switching device $T_5$ are switched ON and OFF out of phase with each other. In buck-boost mode, the input switching device $T_4$ and the second output switching device $T_5$ are switched ON and OFF in phase with each other, and the first output switching device $T_6$ is switched ON and OFF out of phase with the input switching device $T_4$ and second output switching device $T_5$.

If node $C_{LP}$ is pulled low through an external source, such as a microprocessor, the part will go into low power mode after 32 cycles have elapsed. When pulled high, it will exit low power mode after two cycles. The currents of the sources are low enough, on the order of tens of micro amps, that the external source is not required to be strong to overdrive the control currents.

Those of skill in the art will recognize that the physical location of the elements illustrated in FIG. 2 can be moved or relocated while retaining the function described above. For example, diode $D_3$ may be implemented with a low side input switching device coupled to a driver, wherein the driver couples to a low side input node.

Furthermore, those skilled in the art will recognize that counters, 26 and 28, merely provide a "wait state" for the switching regulator, wherein the switching regulator waits for a predetermined amount of time after having received low power condition prior to entry into the low power mode. Thereby, an alternate embodiment may remove counters, 26 and 28, and still provide a switching regulator having a control circuit that automatically determines when the switching regulator should enter and exit low power mode.

Figure 3:
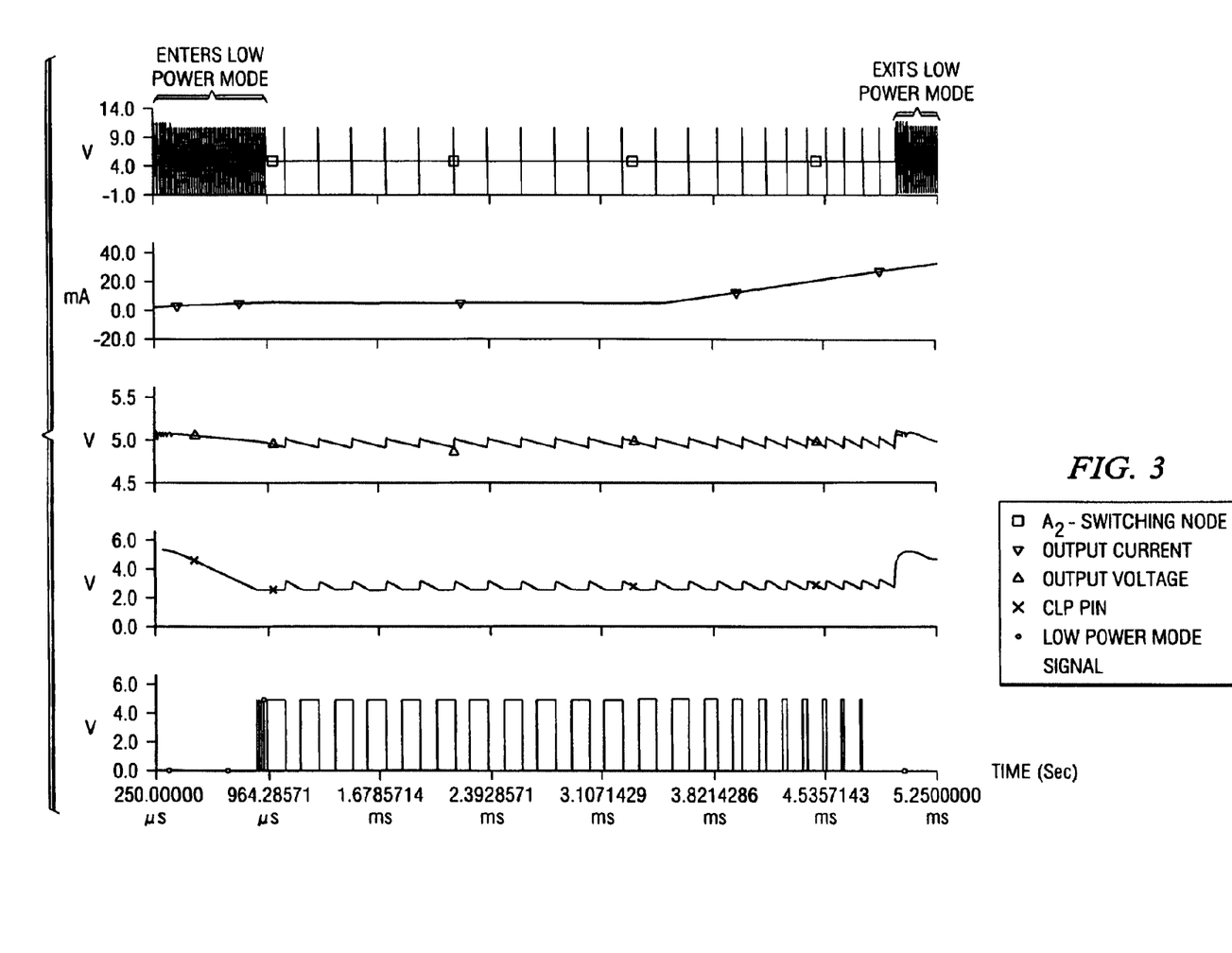
FIG. 3 displays the timing diagram of the switching node, the output current, the output voltage, the low power capacitance node, and the low power mode signal of the switching regulator shown in FIG. 2 for entrance and exit from the low power mode.

FIG. 3 displays the timing diagram of the switching node, the output current, the output voltage, the low power capacitance node, and the low power mode signal of the switching regulator shown in FIG. 2 for entrance and exit from the low power mode. As shown when the switching regulator is in low power mode and the output current increases above a particular threshold, the switching regulator exits low power mode.

FIG. 4 illustrates a timing diagram of specific signals and nodes of the switching regulator just prior to entry into a low power mode and after entry into a low power mode. As shown, switching node $A_2$ switches from −1 volt to 9 volts. Although hard to distinguish with the naked eye, the output current and voltage decrease as time increases. The voltage at node $C_{LP}$ consistently decreases as well. When the output voltage reaches the threshold of being less than twice the reference voltage $V_{ref}$, then the low power mode signal is generated as shown. This signals duration lasts for 32 cycles and then the switching regulator enters into low power mode.

FIG. 5 displays the timing diagram of the switching node, the output current, the output voltage, the low power capacitance node, and the low power mode signal of the switching regulator shown in FIG. 2 for exiting out of the low power mode. As shown in FIG. 5, when the switching device $T_4$ is on, as indicated by switching node $A_2$, the voltage at node $C_{LP}$ rises. This is a direct result of the increase of current $i_1$. When switching device $T_4$ turns off, the voltage at node $C_{LP}$ decreases in value since current $i_2$ subtracts from that which is supplied at node $C_{LP}$.

Advantages of this design include but are not limited to a switching regulator having a control circuit that automatically determines when the switching regulator will enter or exit a low power mode without the requirement for an external signal. It does not require an expensive precision resistor on the output to sense output current, as well as an additional feedback pin from the resistor. It does require an additional capacitor, however, this capacitor can be a standard ceramic type with no special requirements. It's value can vary widely and the system will still work correctly. It is also independent of input voltage, duty cycle, inductance, output voltage, and most importantly output capacitance.

Since entrance and exit from the low power mode occurs automatically with a separate external capacitor $C_1$ that is independent from the output capacitor $C_{out2}$ as well as the input voltage, this circuit will work with any value of an output capacitor or any input voltage without affecting the point where the switching regulator exits or enters the low power mode. Most known switching regulators point of entry or exit into and out of the low power mode, however, are effected by the value of the external capacitor or output voltage. For example, if the external capacitor is altered, the current required for the switching regulator to enter or exit the low power mode will be changed. Furthermore, in conventional switching regulators, if the voltage of the input driver changes, the point that the switching regulator enters or exits low power mode will change.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A switching regulator, comprising:
   a driver coupled to receive a first high side control signal;
   an input switching device having a source node, a drain node, and a control node, the control node coupled to an output of the driver, the drain node coupled to receive an input voltage;
   a diode coupled between the source node of the input switching device and ground;
   an inductor having a first end coupled to the source node of the input switching device;
   a first output switching device having a drain node coupled to the second end of the inductor, the first output switching device having a control node coupled to a second high side control signal;
   a second output switching device having a drain node coupled to the second end of the inductor, the second output switching device having a control node coupled to a low side control signal, the second output switching device having a source node coupled to ground;
   an output load coupled between the source nodes of the first and second output switching devices;
   an output capacitor coupled between the source nodes of the first and second output switching devices to provide an output voltage; and
   a low power control circuit coupled across the inductor, wherein the low power control circuit monitors the current delivered to the output load and automatically initiates the low power mode of the switching regulator independent of the value of the output voltage, the output capacitor, the inductor and the input voltage.

2. A switching regulator as recited in claim 1, wherein the low power control circuit comprises:
   a low power switching device having a control node coupled to receive the high side control signal and a drain node coupled to the second end of the inductor;
   an amplifier coupled to the source node of the low power switching device and the first output switching device;
   a first current mirror coupled to the amplifier to mirror the output current delivered to the output load through the low power switching device;
   a second current mirror coupled to the first current mirror;
   a current source coupled between the second current mirror and ground;
   a capacitor coupled across the current source;
   a comparator coupled to the second current mirror and coupled to receive a predetermined voltage source to compare the voltage across the capacitor with the predetermined voltage source;
   a first AND gate coupled to the comparator and to receive the low power mode signal;
   an inverter coupled to receive the low power mode signal to generate an inverted low power mode signal;
   a second AND gate coupled to the comparator and to receive the inverted low power mode signal and the inductive switch signal;
   a first counter, having an input and an output, the input coupled to the first AND gate to provide a low power entry signal at the output, the output coupled to the second AND gate; and
   a second counter, having an input and an output, the input coupled to the second AND gate to provide a low power exit signal at the output, the output coupled to the first AND gate.

3. The switching regulator as recited in claim 1, wherein the first input switching device is a transistor.

4. The switching regulator as recited in claim 1, wherein the second input switching device is a transistor.

5. The switching regulator as recited in claim 1, wherein the first output switching device is a transistor.

6. The switching regulator as recited in claim 1, wherein the second output switching device is a transistor.

7. The switching regulator as recited in claim 1, wherein the first input switching device is a metal-oxide-semiconductor field-effect transistor (Mos FET).

8. The switching regulator as recited in claim 1, wherein the second input switching device is a Mos FET transistor.

9. The switching regulator as recited in claim 1, wherein the first output switching device is a Mos FET transistor.

10. The switching regulator as recited in claim 1, wherein the second output switching device is a Mos FET transistor.

11. The switching regulator as recited in claim 1, wherein the output load is
    a resistor.

12. The switching regulator as recited in claim 2, wherein the low power switching device is a transistor.

13. The switching regulator as recited in claim 2, wherein the low power switching device is a sense FET transistor.

14. The switching regulator as recited in claim 2, wherein the first current mirror, comprises:
    a first transistor, having a drain node coupled to the source node of the low power switching device; and
    a second transistor coupled to the first transistor, the control node of the first and second transistors coupled to the amplifier, the source node of the second transistor coupled to the source node of the first transistor.

15. The switching regulator as recited in claim 2, wherein the second current mirror, comprises:
    a first transistor, having a drain node, a source node, and a control node, the drain node coupled to the control node and the drain node coupled to the first current mirror; and
    a second transistor having a drain node, a control node and a source node, the control node coupled to the control node of the first transistor, the source node coupled to the source node of the first transistor, the drain node coupled to the capacitor.

* * * * *